(12) United States Patent
Zhang (10) Patent No.: US 9,769,055 B2
(45) Date of Patent: Sep. 19, 2017

(54) METHOD FOR GENERATING ROUTE ENTRY, AND BORDER GATEWAY PROTOCOL SPEAKER

(71) Applicant: Huawei Technologies Co., Ltd., Shenzhen (CN)

(72) Inventor: Li Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 15/011,211

(22) Filed: Jan. 29, 2016

(65) Prior Publication Data

US 2016/0149797 A1    May 26, 2016

Related U.S. Application Data

(63) Continuation of application No. PCT/CN2014/081791, filed on Jul. 8, 2014.

(30) Foreign Application Priority Data

Jul. 30, 2013   (CN) .......................... 2013 1 0326163

(51) Int. Cl.
  *H04L 12/733*   (2013.01)
  *H04L 12/66*    (2006.01)
  *H04L 12/803*   (2013.01)

(52) U.S. Cl.
  CPC ............ *H04L 45/122* (2013.01); *H04L 12/66* (2013.01); *H04L 47/125* (2013.01)

(58) Field of Classification Search
  CPC ...... H04L 45/122; H04L 12/66; H04L 47/125
  See application file for complete search history.

(56) References Cited

U.S. PATENT DOCUMENTS

| 8,018,941 B2 * | 9/2011 | Kwapniewski | ......... H04L 45/00 370/389 |
| 2004/0034702 A1 * | 2/2004 | He | ...................... H04L 12/4633 709/224 |

(Continued)

FOREIGN PATENT DOCUMENTS

| CN | 101404620 A | 4/2009 |
| CN | 102186221 A | 9/2011 |

(Continued)

OTHER PUBLICATIONS

Rekhter et al., "A Border Gateway Protocol 4 (BGP-4)," Network Working Group, Request for Comments: 4271, The Internet Society, Reston, Virginia (Jan. 2006).

*Primary Examiner* — Ajay Cattungal
(74) *Attorney, Agent, or Firm* — Leydig, Voit & Mayer, Ltd.

(57) ABSTRACT

Embodiments of the present disclosure provide a method for generating a route entry, including: receiving, by a first BGP speaker, a first route message and a second route message that are distributed respectively by a second BGP speaker by using a first distribution path and a second distribution path; determining, by the first BGP speaker, that a quantity of next hops in a first next hop list attribute is less than a quantity of next hops in a second next hop list attribute; and generating, by the first BGP speaker, a route entry according to path attributes, of a path towards a destination, in the first route message. In addition, the embodiments of the present disclosure further provide a first BGP speaker. The foregoing technical solution helps reduce a workload in configuring route preference policies.

15 Claims, 2 Drawing Sheets

---

A first BGP speaker receives a first route message and a second route message that are distributed respectively by a second BGP speaker by using a first distribution path and a second distribution path
S101

The first BGP speaker determines that a quantity of next hops in a first next hop list attribute is less than a quantity of next hops in a second next hop list attribute
S102

The first BGP speaker generates a routing entry according to path attributes of a path towards a destination in the first route message
S103

(56) References Cited

U.S. PATENT DOCUMENTS

| | | | | |
|---|---|---|---|---|
| 2004/0073640 | A1* | 4/2004 | Martin | H04L 29/12066 709/223 |
| 2006/0209716 | A1* | 9/2006 | Previdi | H04L 45/02 370/254 |
| 2007/0086461 | A1* | 4/2007 | Ward | H04L 45/04 370/392 |
| 2007/0091794 | A1* | 4/2007 | Filsfils | H04L 12/66 370/228 |
| 2007/0258447 | A1* | 11/2007 | Raszuk | H04L 12/66 370/389 |

FOREIGN PATENT DOCUMENTS

| | | |
|---|---|---|
| CN | 102546419 A | 7/2012 |
| CN | 102957610 A | 3/2013 |

\* cited by examiner

A first BGP speaker receives a first route message and a second route message that are distributed respectively by a second BGP speaker by using a first distribution path and a second distribution path

S101

The first BGP speaker determines that a quantity of next hops in a first next hop list attribute is less than a quantity of next hops in a second next hop list attribute

S102

The first BGP speaker generates a routing entry according to path attributes of a path towards a destination in the first route message

METHOD FOR GENERATING ROUTE ENTRY, AND BORDER GATEWAY PROTOCOL SPEAKER

CROSS-REFERENCE TO RELATED APPLICATIONS

This application is a continuation of International Patent Application No. PCT/CN2014/081791, filed on Jul. 8, 2014, which claims priority to Chinese Patent Application No. 201310326163.4, filed on Jul. 30, 2013, both of which are hereby incorporated by reference in their entireties.

TECHNICAL FIELD

Embodiments of the present application relate to communications technologies, and in particular, to a method for generating a route entry, and a Border Gateway Protocol (BGP) speaker.

BACKGROUND

The Border Gateway Protocol (BGP) is a very widely used routing protocol. For the BGP, reference may be made to an RFC 4271 published by the Internet Engineering Task Force (IETF). One BGP speaker may receive multiple route messages that are sent by multiple peers (peer) and that include routes towards a destination. The BGP speaker needs to select, as a preferred route message, one route message from the multiple route messages, so as to generate a route entry towards the destination. In the prior art, corresponding route preference policies need to be respectively configured for the multiple peers. For example, multiple peer priorities may be configured for the multiple peers respectively; or multiple local-preference values may be configured for the multiple peers respectively. In the foregoing technical solution, corresponding route preference policies need to be respectively configured for multiple peers; therefore, a workload is relatively heavy, and implementation is relatively complex.

SUMMARY

Embodiments of the present application provide a method for generating a route entry, and a BGP speaker, which helps reduce a workload in configuring route preference policies, and simplifies implementation.

According to a first aspect, a method for generating a route entry is provided, including:

receiving, by a first BGP speaker, a first route message and a second route message that are distributed respectively by a second BGP speaker by using a first distribution path and a second distribution path, where a head node of the first distribution path is the second BGP speaker, a tail node of the first distribution path is the first BGP speaker, a head node of the second distribution path is the second BGP speaker, a tail node of the second distribution path is the first BGP speaker, path attributes, of a path towards a destination, in the first route message include a next hop list attribute, path attributes, of a path towards the destination, in the second route message include a next hop list attribute, and the first route message and the second route message are obtained through the following processing:

constructing, by the second BGP speaker, a third route message, where the third route message includes a route towards the destination, the route towards the destination in the third route message includes a next hop list attribute and a next hop attribute (NEXT_HOP attribute), of a next hop towards the destination, distributed by the second BGP speaker, the next hop list attribute in the third route message includes a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, where the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which specifically includes: adding a first next hop to the next hop list attribute in the route towards the destination, so as to generate a first next hop list attribute, where the fourth route message includes path attributes of a path towards the destination, the path attributes in the fourth route message include a NEXT_HOP attribute, the path attributes in the fourth route message include the first next hop list attribute, and a value of the first next hop is equal to a value of the NEXT_HOP attribute in the fourth route message, where the tail node of the first path generates the first route message;

constructing, by the second BGP speaker, a fifth route message, where the fifth route message includes a route towards the destination, the route towards the destination in the fifth route message includes a next hop list attribute and the NEXT_HOP attribute, of a next hop towards the destination, distributed by the second BGP speaker, the next hop list attribute in the fifth route message includes a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path, where the second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which specifically includes: adding a second next hop to the next hop list attribute in the route towards the destination, so as to generate a second next hop list attribute, where the sixth route message includes path attributes of a path towards the destination, the path attributes in the sixth route message include a NEXT_HOP attribute, the path attributes in the sixth route message include the second next hop list attribute, and a value of the second next hop is equal to a value of the NEXT_HOP attribute in the sixth route message, where the tail node of the second path generates the second route message;

determining, by the first BGP speaker, that a quantity of next hops in the first next hop list attribute is less than a quantity of next hops in the second next hop list attribute; and generating, by the first BGP speaker, a route entry according to the path attributes, of the path towards the destination, in the first route message.

In the foregoing technical solution, a first BGP speaker receives a first route message and a second route message. The first route message and the second route message each carry a route towards a destination. The first route message and the second route message respectively carry a first next hop list attribute and a second next hop list attribute. The first BGP speaker determines that a quantity of next hops in the first next hop list attribute is less than a quantity of next hops in the second next hop list attribute. The first BGP speaker generates a route entry according to path attributes, of a path towards the destination, in the first route message. The first BGP speaker selects a route message according to a next hop list attribute. In the foregoing technical solution, corresponding route preference policies do not need to be respectively configured for multiple peers, which helps reduce a workload in configuring route preference policies.

In a first possible implementation manner of the first aspect, the generating, by the tail node of the first path, the first route message includes:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message includes:

when the route that is distributed by the second BGP speaker and is towards the destination reaches the tail node of the second path, adding, by the tail node of the second path, a second priority to the next hop list attribute in the route towards the destination; and the method further includes:

determining, by the first BGP speaker, that the quantity of next hops in the first next hop list attribute is equal to the quantity of next hops in the second next hop list attribute;

determining, by the first BGP speaker, that the first priority is higher than the second priority; and generating, by the first BGP speaker, the route entry according to the path attributes, of the path towards the destination, in the first route message corresponding to the first priority.

In a second possible implementation manner of the first aspect, the next hop list attribute in the third route message further includes a path cost list, and the path cost list includes a path cost spent from the second BGP speaker to the destination;

when the route that is distributed by the second BGP speaker and is towards the destination reaches each node of the first path, the generating, by each node, a fourth route message specifically includes: adding, to a path cost list in the route towards the destination, a path cost spent from a local BGP speaker to a previous hop BGP speaker;

the next hop list attribute in the fifth route message further includes a path cost list, and the path cost list includes a path cost spent from the second BGP speaker to the destination;

when the route that is distributed by the second BGP speaker and is towards the destination reaches each node of the second path, the generating, by each node, a sixth route message specifically includes: adding, to the path cost list in the route towards the destination, the path cost spent from a local BGP speaker to a previous hop BGP speaker; and the method further includes:

determining, by the first BGP speaker, that the quantity of next hops in the first next hop list attribute is equal to the quantity of next hops in the second next hop list attribute;

determining, by the first BGP speaker, that a first cost is less than a second cost, where the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and generating, by the first BGP speaker, the route entry according to the path attributes, of the path towards the destination, in the first route message corresponding to the first cost.

According to the second possible implementation manner of the first aspect, in a third possible implementation manner of the first aspect, the path cost is an Interior Gateway Protocol (IGP) cost.

According to the second possible implementation manner of the first aspect or the third possible implementation manner of the first aspect, in a fourth possible implementation manner of the first aspect, the path cost spent from the second BGP speaker to the destination in the third route message is not equal to the path cost spent from the second BGP speaker to the destination in the fifth route message.

According to a second aspect, a first BGP speaker is provided, including:

a receiving unit, configured to receive a first route message and a second route message that are distributed respectively by a second BGP speaker by using a first distribution path and a second distribution path, where a head node of the first distribution path is the second BGP speaker, a tail node of the first distribution path is the first BGP speaker, a head node of the second distribution path is the second BGP speaker, a tail node of the second distribution path is the first BGP speaker, path attributes, of a path towards a destination, in the first route message include a next hop list attribute, path attributes, of a path towards the destination, in the second route message include a next hop list attribute, and the first route message and the second route message are obtained through the following processing:

constructing, by the second BGP speaker, a third route message, where the third route message includes a route towards the destination, the route towards the destination in the third route message includes a next hop list attribute and a NEXT_HOP attribute, of a next hop towards the destination, distributed by the second BGP speaker, the next hop list attribute in the third route message includes a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, where the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which specifically includes: adding a first next hop to the next hop list attribute in the route towards the destination, so as to generate a first next hop list attribute, where the fourth route message includes path attributes of a path towards the destination, the path attributes in the fourth route message include a NEXT_HOP attribute, the path attributes in the fourth route message include the first next hop list attribute, and a value of the first next hop is equal to a value of the NEXT_HOP attribute in the fourth route message, where the tail node of the first path generates the first route message;

constructing, by the second BGP speaker, a fifth route message, where the fifth route message includes a route towards the destination, the route towards the destination in the fifth route message includes a next hop list attribute and the NEXT_HOP attribute, of a next hop towards the destination, distributed by the second BGP speaker, the next hop list attribute in the fifth route message includes a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path, where the second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which specifically includes: adding a second next hop to the next hop list attribute in the route towards the destination, so as to generate a second next hop list attribute, where the sixth route message includes path attributes of a path towards the destination, the path attributes in the sixth route message include a NEXT_HOP attribute, the path attributes in the sixth route message include the second next hop list attribute, and a value of the second next hop is equal to a value of the NEXT_HOP attribute in the sixth route message, where the tail node of the second path generates the second route message;

a determining unit, configured to determine that a quantity of next hops in the first next hop list attribute is less than a quantity of next hops in the second next hop list attribute; and a generating unit, configured to generate a route entry according to the path attributes, of the path towards the destination, in the first route message.

In the foregoing technical solution, a first BGP speaker receives a first route message and a second route message. The first route message and the second route message each carry a route towards a destination. The first route message and the second route message respectively carry a first next hop list attribute and a second next hop list attribute. The first BGP speaker determines that a quantity of next hops in the first next hop list attribute is less than a quantity of next hops in the second next hop list attribute. The first BGP speaker generates a route entry according to path attributes, of a path towards the destination, in the first route message. The first BGP speaker selects a route message according to a next hop list attribute. In the foregoing technical solution, corresponding route preference policies do not need to be respectively configured for multiple peers, which helps reduce a workload in configuring route preference policies.

In a first possible implementation manner of the second aspect, the generating, by the tail node of the first path, the first route message includes:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message includes:

when the route that is distributed by the second BGP speaker and is towards the destination reaches the tail node of the second path, adding, by the tail node of the second path, a second priority to the next hop list attribute in the route towards the destination;

the determining unit is further configured to:

determine that the quantity of next hops in the first next hop list attribute is equal to the quantity of next hops in the second next hop list attribute; and determine that the first priority is higher than the second priority; and the generating unit is further configured to:

generate the route entry according to the path attributes, of the path towards the destination, in the first route message corresponding to the first priority.

In a second possible implementation manner of the second aspect, the next hop list attribute in the third route message further includes a path cost list, and the path cost list includes a path cost spent from the second BGP speaker to the destination;

when the route that is distributed by the second BGP speaker and is towards the destination reaches each node of the first path, the generating, by each node, a fourth route message specifically includes: adding, to the path cost list in the route towards the destination, a path cost spent from a local BGP speaker to a previous hop BGP speaker;

the next hop list attribute in the fifth route message further includes a path cost list, and the path cost list includes a path cost spent from the second BGP speaker to the destination;

when the route that is distributed by the second BGP speaker and is towards the destination reaches each node of the second path, the generating, by each node, a sixth route message specifically includes: adding, to the path cost list in the route towards the destination, the path cost spent from a local BGP speaker to a previous hop BGP speaker;

the determining unit is further configured to:

determine that the quantity of next hops in the first next hop list attribute is equal to the quantity of next hops in the second next hop list attribute; and determine that a first cost is less than a second cost, where the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and the generating unit is further configured to:

generate the route entry according to the path attributes, of the path towards the destination, in the first route message corresponding to the first cost.

According to the second possible implementation manner of the second aspect, in a third possible implementation manner of the second aspect, the path cost is an IGP cost.

According to the second possible implementation manner of the second aspect or the third possible implementation manner of the second aspect, in a fourth possible implementation manner of the second aspect, the path cost spent from the second BGP speaker to the destination in the third route message is not equal to the path cost spent from the second BGP speaker to the destination in the fifth route message.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions of the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

Figure 1:
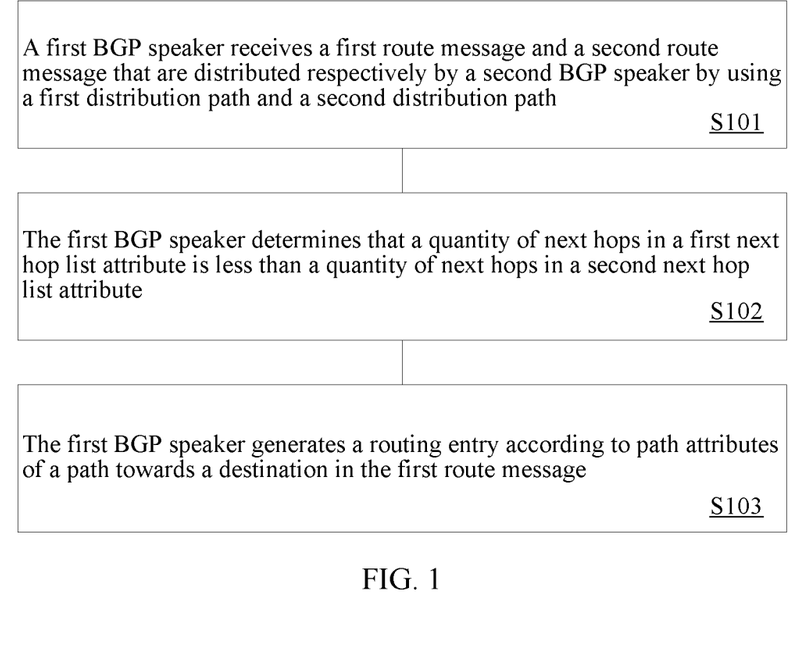
FIG. 1 is a schematic flowchart of a method for generating a route entry according to an embodiment of the present application.

FIG. 1 is a schematic flowchart of a method for generating a route entry according to an embodiment of the present application. The method may be executed by a network device which can run the BGP. The network device may be a router. Referring to FIG. 1, the method includes:

S101: A first BGP speaker receives a first route message and a second route message that are distributed respectively by a second BGP speaker by using a first distribution path and a second distribution path.

A head node of the first distribution path is the second BGP speaker. A tail node of the first distribution path is the first BGP speaker. A head node of the second distribution path is the second BGP speaker. A tail node of the second distribution path is the first BGP speaker. Path attributes of a path towards a destination in the first route message include a next hop list attribute. Path attributes of a path towards the destination in the second route message include a next hop list attribute, and the first route message and the second route message are obtained through the following processing:

constructing, by the second BGP speaker, a third route message, where the third route message includes a route towards the destination. The route towards the destination in the third route message includes a next hop list attribute and a NEXT_HOP attribute, of a next hop towards the destination, distributed by the second BGP speaker. The next hop list attribute in the third route message includes a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, where the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which includes: adding a first next hop to the next hop list attribute in the route towards the destination, so as to generate a first next hop list attribute. The fourth route message includes path attributes of a path towards the destination. The path attributes in the fourth route message include a NEXT_HOP attribute. The path attributes in the fourth route message include the first next hop list attribute, and a value of the first next hop is equal to a value of the NEXT_HOP attribute in the fourth route message, where the tail node of the first path generates the first route message;

constructing, by the second BGP speaker, a fifth route message, where the fifth route message includes a route towards the destination. The route towards the destination in the fifth route message includes a next hop list attribute and the NEXT_HOP attribute, of a next hop towards the destination, distributed by the second BGP speaker. The next hop list attribute in the fifth route message includes a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path. The second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which includes: adding a second next hop to the next hop list attribute in the route towards the destination, so as to generate a second next hop list attribute. The sixth route message includes path attributes of a path towards the destination, the path attributes in the sixth route message include a NEXT_HOP attribute, the path attributes in the sixth route message include the second next hop list attribute, and a value of the second next hop is equal to a value of the NEXT_HOP attribute in the sixth route message, where the tail node of the second path generates the second route message.

For example, the destination may be a host or a network. When the destination is the host, the host may be indicated by using an IP address. When the destination is the network, the network may be indicated by using a prefix of an IP address.

For example, the first path may not include any BGP speaker. That is, the first BGP speaker may be a peer of the second BGP speaker.

For example, the second path may include only one BGP speaker. That is, a BGP speaker on the second path may be a peer of the first BGP speaker. In addition, a BGP speaker on the second path may be a peer of the second BGP speaker.

For example, S101 may be executed by a receiver.

S102: The first BGP speaker determines that a quantity of next hops in a first next hop list attribute is less than a quantity of next hops in a second next hop list attribute.

For example, when the first path does not include any BGP speaker, the quantity of next hops in the first next hop list attribute is 0.

For example, when the second path includes only one BGP speaker, the quantity of next hops in the second next hop list attribute is 1.

For example, S102 may be executed by a processor.

S103: The first BGP speaker generates a route entry according to path attributes, of a path towards a destination, in the first route message.

For example, a match field of the route entry may include an identifier of the destination. The identifier of the destination may be the IP address or a prefix of the IP address. The route entry may be used to guide forwarding of an Internet Protocol datagram (IP datagram) that is towards the destination.

For example, S103 may be executed by the processor.

In the foregoing technical solution, a first BGP speaker receives a first route message and a second route message. The first route message and the second route message each carry a route towards a destination. The first route message and the second route message respectively carry a first next hop list attribute and a second next hop list attribute. The first BGP speaker determines that a quantity of next hops in the first next hop list attribute is less than a quantity of next hops in the second next hop list attribute. The first BGP speaker generates a route entry according to path attributes, of a path towards the destination, in the first route message. The first BGP speaker selects a route message according to a next hop list attribute. In the foregoing technical solution, corresponding route preference policies do not need to be respectively configured for multiple peers, which helps reduce a workload in configuring route preference policies.

Optionally, in the method shown in FIG. 1, the generating, by the tail node of the first path, the first route message includes:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message includes:

when the route that is distributed by the second BGP speaker and is towards the destination reaches the tail node of the second path, adding, by the tail node of the second path, a second priority to the next hop list attribute in the route towards the destination; and the method further includes:

determining, by the first BGP speaker, that the quantity of next hops in the first next hop list attribute is equal to the quantity of next hops in the second next hop list attribute;

determining, by the first BGP speaker, that the first priority is higher than the second priority; and generating, by the first BGP speaker, the route entry according to the path attributes, of the path towards the destination, in the first route message corresponding to the first priority.

Optionally, in the method shown in FIG. 1, the next hop list attribute in the third route message further includes a path cost list, and the path cost list includes a path cost spent from the second BGP speaker to the destination;

when the route that is distributed by the second BGP speaker and is towards the destination reaches each node of the first path, the generating, by each node, a fourth route message includes: adding, to the path cost list in the route towards the destination, a path cost spent from a local BGP speaker to a previous hop BGP speaker;

the next hop list attribute in the fifth route message further includes a path cost list, and the path cost list includes a path cost spent from the second BGP speaker to the destination;

when the route that is distributed by the second BGP speaker and is towards the destination reaches each node of the second path, the generating, by each node, a sixth route message includes: adding, to the path cost list in the route towards the destination, the path cost spent from a local BGP speaker to a previous hop BGP speaker; and the method further includes:

determining, by the first BGP speaker, that the quantity of next hops in the first next hop list attribute is equal to the quantity of next hops in the second next hop list attribute;

determining, by the first BGP speaker, that a first cost is less than a second cost, where the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and generating, by the first BGP speaker, the route entry according to the path attributes, of the path towards the destination, in the first route message corresponding to the first cost.

Optionally, in the foregoing technical solution, the path cost is an Interior Gateway Protocol (IGP) cost.

Optionally, in the foregoing technical solution, the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is equal to the path cost spent from the second BGP speaker to the destination in the fifth route message. For example, the path cost spent from the second BGP speaker to the destination in the third route message may be 0. The path cost spent from the second BGP speaker to the destination in the fifth route message may be 0.

Optionally, in the foregoing technical solution, the next hop list attribute in the third route message further includes a priority list, and the priority list includes a priority of the second BGP speaker;

when the route that is distributed by the second BGP speaker and is towards the destination reaches each node of the first path, the generating, by each node, a fourth route message includes: adding a priority of a local BGP speaker to a priority list in the route towards the destination;

the next hop list attribute in the fifth route message further includes a priority list, and the priority list includes the priority of the second BGP speaker; and when the route that is distributed by the second BGP speaker and is towards the destination reaches each node of the second path, the generating, by each node, a sixth route message includes: adding the priority of the local BGP speaker to the priority list in the route towards the destination.

Optionally, the method further includes:

determining, by the first BGP speaker, that the quantity of next hops in the first next hop list attribute is equal to the quantity of next hops in the second next hop list attribute;

determining, by the first BGP speaker, that the first priority is higher than the second priority. The first priority and the second priority may be a priority of the second BGP speaker in the priority list in the third route message and a priority of the second BGP speaker in the priority list in the fifth route message, respectively. Or the first priority and the second priority may be a priority, which is added by the tail node of the first path, of the local BGP speaker and a priority, which is added by the tail node of the second path, of the local BGP speaker respectively; and generating, by the first BGP speaker, the route entry according to the path attributes, of the path towards the destination, in the first route message including the first priority.

Figures 2, 3:
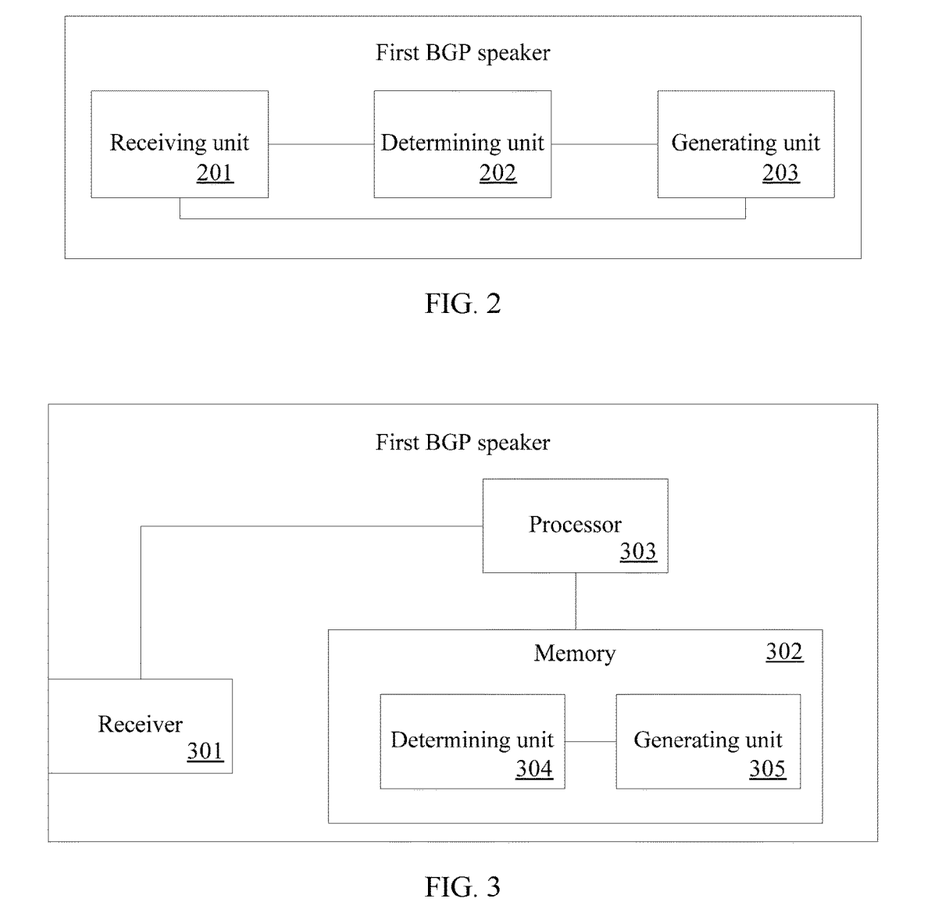
FIG. 2 is a schematic structural diagram of a BGP speaker according to an embodiment of the present application.
FIG. 3 is a schematic structural diagram of a BGP speaker according to an embodiment of the present application.

FIG. 2 is a schematic structural diagram of a first BGP speaker according to an embodiment of the present application. The first BGP speaker may be configured to perform the method shown in FIG. 1. Referring to FIG. 2, the first BGP speaker includes: a receiving unit 201, a determining unit 202, and a generating unit 203.

The receiving unit 201 is configured to receive a first route message and a second route message that are distributed respectively by a second BGP speaker by using a first distribution path and a second distribution path. A head node of the first distribution path is the second BGP speaker. A tail node of the first distribution path is the first BGP speaker. A head node of the second distribution path is the second BGP speaker. A tail node of the second distribution path is the first BGP speaker. Path attributes of a path towards a destination in the first route message include a next hop list attribute. Path attributes of a path towards the destination in the second route message include a next hop list attribute, and the first route message and the second route message are obtained through the following processing:

constructing, by the second BGP speaker, a third route message, where the third route message includes a route towards the destination. The route towards the destination in the third route message includes a next hop list attribute and a NEXT_HOP attribute, of a next hop towards the destination, distributed by the second BGP speaker. The next hop list attribute in the third route message includes a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, where the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which includes: adding a first next hop to the next hop list attribute in the route towards the destination, so as to generate a first next hop list attribute. The fourth route message includes path attributes of a path towards the destination. The path attributes in the fourth route message include a NEXT_HOP attribute. The path attributes in the fourth route message include the first next hop list attribute, and a value of the first next hop is equal to a value of the NEXT_HOP attribute in the fourth route message, where the tail node of the first path generates the first route message;

constructing, by the second BGP speaker, a fifth route message, where the fifth route message includes a route towards the destination. The route towards the destination in the fifth route message includes a next hop list attribute and the NEXT_HOP attribute, of a next hop towards the destination, distributed by the second BGP speaker. The next hop list attribute in the fifth route message includes a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path. The second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which includes: adding a second next hop to the next hop list attribute in the route towards the destination, so as to generate a second next hop list attribute. The sixth route message includes path attributes of a path towards the destination, the path attributes in the sixth route message include a NEXT_HOP attribute, the path attributes in the sixth route message include the second next hop list attribute, and a value of the second next hop is equal to a value of the NEXT_HOP attribute in the sixth route message, where the tail node of the second path generates the second route message.

For example, the destination may be a host or a network. When the destination is the host, the host may be indicated by using an IP address. When the destination is the network, the network may be indicated by using a prefix of an IP address.

For example, the first path may not include any BGP speaker. That is, the first BGP speaker may be a peer of the second BGP speaker.

For example, the second path may include only one BGP speaker. That is, a BGP speaker on the second path may be a peer of the first BGP speaker. In addition, a BGP speaker on the second path may be a peer of the second BGP speaker.

The determining unit 202 is configured to determine that a quantity of next hops in the first next hop list attribute is less than a quantity of next hops in the second next hop list attribute.

For example, when the first path does not include any BGP speaker, the quantity of next hops in the first next hop list attribute is 0.

For example, when the second path includes only one BGP speaker, the quantity of next hops in the second next hop list attribute is 1.

The generating unit 203 is configured to generate a route entry according to the path attributes, of the path towards the destination, in the first route message.

For example, a match field of the route entry may include an identifier of the destination. The identifier of the destination may be the IP address or a prefix of the IP address. The route entry may be used to guide forwarding of an IP datagram that is towards the destination.

In the foregoing technical solution, a first BGP speaker receives a first route message and a second route message. The first route message and the second route message each carry a route towards a destination. The first route message and the second route message respectively carry a first next hop list attribute and a second next hop list attribute. The first BGP speaker determines that a quantity of next hops in the first next hop list attribute is less than a quantity of next hops in the second next hop list attribute. The first BGP speaker generates a route entry according to path attributes, of a path towards the destination, in the first route message. The first BGP speaker selects a route message according to a next hop list attribute. In the foregoing technical solution, corresponding route preference policies do not need to be respectively configured for multiple peers, which helps reduce a workload in configuring route preference policies.

Optionally, in the first BGP speaker shown in FIG. 2, the generating, by the tail node of the first path, the first route message includes:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message includes:

when the route that is distributed by the second BGP speaker and is towards the destination reaches the tail node of the second path, adding, by the tail node of the second path, a second priority to the next hop list attribute in the route towards the destination;

the determining unit 202 is further configured to determine that the quantity of next hops in the first next hop list attribute is equal to the quantity of next hops in the second next hop list attribute, and determine that the first priority is higher than the second priority; and the generating unit 203 is further configured to generate the route entry according to the path attributes, of the path towards the destination, in the first route message corresponding to the first priority.

Optionally, in the first BGP speaker shown in FIG. 2, the next hop list attribute in the third route message further includes a path cost list, and the path cost list includes a path cost spent from the second BGP speaker to the destination;

when the route that is distributed by the second BGP speaker and is towards the destination reaches each node of the first path, the generating, by each node, a fourth route message includes: adding, to the path cost list in the route towards the destination, a path cost spent from a local BGP speaker to a previous hop BGP speaker;

the next hop list attribute in the fifth route message further includes a path cost list, and the path cost list includes a path cost spent from the second BGP speaker to the destination;

when the route that is distributed by the second BGP speaker and is towards the destination reaches each node of the second path, the generating, by each node, a sixth route message includes: adding, to the path cost list in the route towards the destination, the path cost spent from a local BGP speaker to a previous hop BGP speaker;

the determining unit 202 is further configured to:

determine that the quantity of next hops in the first next hop list attribute is equal to the quantity of next hops in the second next hop list attribute; and determine that a first cost is less than a second cost, where the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and the generating unit 203 is further configured to generate the route entry according to the path attributes, of the path towards the destination, in the first route message corresponding to the first cost.

Optionally, in the foregoing technical solution, the path cost is an IGP cost.

Optionally, in the foregoing technical solution, the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is equal to the path cost spent from the second BGP speaker to the destination in the fifth route message. For example, the path cost spent from the second BGP speaker to the destination in the third route message may be 0. The path cost spent from the second BGP speaker to the destination in the fifth route message may be 0.

Optionally, in the foregoing technical solution, the next hop list attribute in the third route message further includes a priority list, and the priority list includes a priority of the second BGP speaker;

when the route that is distributed by the second BGP speaker and is towards the destination reaches each node of the first path, the generating, by each node, a fourth route message specifically includes: adding a priority of a local BGP speaker to a priority list in the route towards the destination;

the next hop list attribute in the fifth route message further includes a priority list, and the priority list includes the priority of the second BGP speaker; and when the route that is distributed by the second BGP speaker and is towards the destination reaches each node of the second path, the generating, by each node, a sixth route message includes: adding the priority of the local BGP speaker to the priority list in the route towards the destination.

Optionally, the technical solution may further include:

determining, by the first BGP speaker, that the quantity of next hops in the first next hop list attribute is equal to the quantity of next hops in the second next hop list attribute;

determining, by the first BGP speaker, that the first priority is higher than the second priority. The first priority and the second priority may be a priority of the second BGP speaker in the priority list in the third route message and a priority of the second BGP speaker in the priority list in the fifth route message, respectively. Or the first priority and the second priority may be a priority, which is added by the tail node of the first path, of the local BGP speaker and a priority, which is added by the tail node of the second path, of the local BGP speaker respectively; and generating, by the first BGP speaker, the route entry according to the path attributes, of the path towards the destination, in the first route message including the first priority.

FIG. 3 is a schematic structural diagram of a first BGP speaker according to an embodiment of the present application. The first BGP speaker shown in FIG. 3 may be configured to perform the method shown in FIG. 1. The first BGP speaker shown in FIG. 3 may be implemented by using the first BGP speaker shown in FIG. 2. Referring to FIG. 3, the first BGP speaker includes: a receiver 301, a memory 302, and a processor 303. The processor 303 is coupled to the receiver 301. The processor 303 is coupled to the memory 302.

The receiver 301 is configured to receive a first route message and a second route message that are distributed respectively by a second BGP speaker by using a first distribution path and a second distribution path. A head node of the first distribution path is the second BGP speaker. A tail node of the first distribution path is the first BGP speaker, a head node of the second distribution path is the second BGP speaker. A tail node of the second distribution path is the first BGP speaker. Path attributes, of a path towards a destination, in the first route message include a next hop list attribute. Path attributes, of a path towards the destination, in the second route message include a next hop list attribute, and the first route message and the second route message are obtained through the following processing:

constructing, by the second BGP speaker, a third route message, where the third route message includes a route towards the destination. The route towards the destination in the third route message includes a next hop list attribute and a NEXT_HOP attribute, of a next hop towards the destination, distributed by the second BGP speaker. The next hop list attribute in the third route message includes a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, where the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which includes: adding a first next hop to the next hop list attribute in the route towards the destination, so as to generate a first next hop list attribute. The fourth route message includes path attributes of a path towards the destination. The path attributes in the fourth route message include a NEXT_HOP attribute. The path attributes in the fourth route message include the first next hop list attribute, and a value of the first next hop is equal to a value of the NEXT_HOP attribute in the fourth route message, where the tail node of the first path generates the first route message;

constructing, by the second BGP speaker, a fifth route message, where the fifth route message includes a route towards the destination. The route towards the destination in the fifth route message includes a next hop list attribute and the NEXT_HOP attribute, of a next hop towards the destination, distributed by the second BGP speaker. The next hop list attribute in the fifth route message includes a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path. The second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which includes: adding a second next hop to the next hop list attribute in the route towards the destination, so as to generate a second next hop list attribute. The sixth route message includes path attributes of a path towards the destination, the path attributes in the sixth route message include a NEXT_HOP attribute, the path attributes in the sixth route message include the second next hop list attribute, and a value of the second next hop is equal to a value of the NEXT_HOP attribute in the sixth route message, where the tail node of the second path generates the second route message.

For example, the destination may be a host or a network. When the destination is the host, the host may be indicated by using an IP address. When the destination is the network, the network may be indicated by using a prefix of an IP address.

For example, the first path may not include any BGP speaker. That is, the first BGP speaker may be a peer of the second BGP speaker.

For example, the second path may include only one BGP speaker. That is, a BGP speaker on the second path may be a peer of the first BGP speaker. In addition, a BGP speaker on the second path may be a peer of the second BGP speaker.

The memory 302 includes code. The processor 303 may access the code. The code includes a determining unit 304 and a generating unit 305. The memory is a non-transitory storage medium (non-transitory storage medium).

The determining unit 304 is configured to determine that a quantity of next hops in the first next hop list attribute is less than a quantity of next hops in the second next hop list attribute.

For example, when the first path does not include any BGP speaker, the quantity of next hops in the first next hop list attribute is 0.

For example, when the second path includes only one BGP speaker, the quantity of next hops in the second next hop list attribute is 1.

The generating unit 305 is configured to generate a route entry according to the path attributes, of the path towards the destination, in the first route message.

For example, a match field of the route entry may include an identifier of the destination. The identifier of the destination may be the IP address or a prefix of the IP address. The route entry may be used to guide forwarding of an IP datagram that is towards the destination.

In the foregoing technical solution, a first BGP speaker receives a first route message and a second route message. The first route message and the second route message each carry a route towards a destination. The first route message and the second route message respectively carry a first next hop list attribute and a second next hop list attribute. The first BGP speaker determines that a quantity of next hops in the first next hop list attribute is less than a quantity of next hops in the second next hop list attribute. The first BGP speaker generates a route entry according to path attributes, of a path towards the destination, in the first route message. The first BGP speaker selects a route message according to a next hop list attribute. In the foregoing technical solution, corresponding route preference policies do not need to be respectively configured for multiple peers, which helps reduce a workload in configuring route preference policies.

Optionally, in the first BGP speaker shown in FIG. 3, the generating, by the tail node of the first path, the first route message includes:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message includes:

when the route that is distributed by the second BGP speaker and is towards the destination reaches the tail node of the second path, adding, by the tail node of the second path, a second priority to the next hop list attribute in the route towards the destination;

the determining unit 304 is further configured to:

determine that the quantity of next hops in the first next hop list attribute is equal to the quantity of next hops in the second next hop list attribute; and determine that the first priority is higher than the second priority; and the generating unit 305 is further configured to:

generate the route entry according to the path attributes, of the path towards the destination, in the first route message corresponding to the first priority.

Optionally, in the first BGP speaker shown in FIG. 3, the next hop list attribute in the third route message further includes a path cost list, and the path cost list includes a path cost spent from the second BGP speaker to the destination;

when the route that is distributed by the second BGP speaker and is towards the destination reaches each node of the first path, the generating, by each node, a fourth route message includes: adding, to the path cost list in the route towards the destination, a path cost spent from a local BGP speaker to a previous hop BGP speaker;

the next hop list attribute in the fifth route message further includes a path cost list, and the path cost list includes a path cost spent from the second BGP speaker to the destination;

when the route that is distributed by the second BGP speaker and is towards the destination reaches each node of the second path, the generating, by each node, a sixth route message includes: adding, to the path cost list in the route towards the destination, the path cost spent from a local BGP speaker to a previous hop BGP speaker;

the determining unit 304 is further configured to:

determine that the quantity of next hops in the first next hop list attribute is equal to the quantity of next hops in the second next hop list attribute; and determine that a first cost is less than a second cost, where the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and the generating unit 305 is further configured to:

generate the route entry according to the path attributes, of the path towards the destination, in the first route message corresponding to the first cost.

Optionally, in the foregoing technical solution, the path cost is an IGP cost.

Optionally, in the foregoing technical solution, the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is not equal to the path cost spent from the second BGP speaker to the destination in the fifth route message.

For example, configuration may be performed on the second BGP speaker in advance, so that the path cost spent from the second BGP speaker to the destination in the third route message is equal to the path cost spent from the second BGP speaker to the destination in the fifth route message. For example, the path cost spent from the second BGP speaker to the destination in the third route message may be 0. The path cost spent from the second BGP speaker to the destination in the fifth route message may be 0.

Optionally, in the foregoing technical solution, the next hop list attribute in the third route message further includes a priority list, and the priority list includes a priority of the second BGP speaker;

when the route that is distributed by the second BGP speaker and is towards the destination reaches each node of the first path, the generating, by each node, a fourth route message specifically includes: adding a priority of a local BGP speaker to a priority list in the route towards the destination;

the next hop list attribute in the fifth route message further includes a priority list, and the priority list includes the priority of the second BGP speaker; and when the route that is distributed by the second BGP speaker and is towards the destination reaches each node of the second path, the generating, by each node, a sixth route message includes: adding the priority of the local BGP speaker to the priority list in the route towards the destination.

Optionally, the technical solution may further include:

determining, by the first BGP speaker, that the quantity of next hops in the first next hop list attribute is equal to the quantity of next hops in the second next hop list attribute;

determining, by the first BGP speaker, that the first priority is higher than the second priority. The first priority and the second priority may be a priority of the second BGP speaker in the priority list in the third route message and a priority of the second BGP speaker in the priority list in the fifth route message respectively. Or the first priority and the second priority may be a priority, which is added by the tail node of the first path, of the local BGP speaker and a priority, which is added by the tail node of the second path, of the local BGP speaker respectively; and generating, by the first BGP speaker, the route entry according to the path attributes, of the path towards the destination, in the first route message including the first priority.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present application. Any variation or replacement readily figured out by a person skilled in the art within the technical scope disclosed in the specification shall fall within the protection scope of the present application. Therefore, the protection scope of the present application shall be subject to the protection scope of the claims.

What is claimed is:

1. A method for generating a route entry, comprising:

receiving, by a first Border Gateway Protocol (BGP) speaker, a first route message and a second route message that are distributed respectively by a second BGP speaker by using a first distribution path and a second distribution path, wherein a head node of the first distribution path is the second BGP speaker, a tail node of the first distribution path is the first BGP speaker, a head node of the second distribution path is the second BGP speaker, a tail node of the second distribution path is the first BGP speaker, path attributes, of a path towards a destination, in the route messages comprise a next hop list attribute, and the process of obtaining the first route message and the second route message comprises:

constructing, by the second BGP speaker, a third route message, wherein the third route message comprises a route towards the destination, the route towards the destination in the third route message comprises a next hop list attribute and a next hop attribute, of a next hop towards the destination, the next hop list attribute in the third route message comprises a next hop, and a value of the next hop in the next hop list attribute in the third route message is equal to a value of the NEXT_HOP attribute, of a next hop towards the destination;

sending, by the second BGP speaker, the third route message to a head node of a first path, so as to distribute a route towards the destination to each node on the first path, wherein the first path is a path in the first distribution path, the head node of the first path is a peer of the second BGP speaker, and a tail node of the first path is a peer of the first BGP speaker;

when the route that is distributed by the second BGP speaker reaches each node of the first path, generating, by each node according to the route towards the destination, a fourth route message to be sent to a next hop BGP speaker, which comprises: adding a first next hop to the next hop list attribute in the route towards the destination, so as to generate a first next hop list attribute, wherein the fourth route message comprises path attributes of a path towards the destination, the path attributes in the fourth route message comprise a NEXT_HOP attribute, the path attributes in the fourth route message comprise the first next hop list attribute, and a value of the first next hop is equal to a value of the NEXT_HOP attribute in the fourth route message, wherein the tail node of the first path generates the first route message;

constructing, by the second BGP speaker, a fifth route message, wherein the fifth route message comprises a route towards the destination, the route towards the destination in the fifth route message comprises a next hop list attribute and the NEXT_HOP attribute, of a next hop towards the destination, distributed by the second BGP speaker, the next hop list attribute in the fifth route message comprises a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path, wherein the second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which comprises: adding a second next hop to the next hop list attribute in the route towards the destination, so as to generate a second next hop list attribute, wherein the sixth route message comprises path attributes of a path towards the destination, the path attributes in the sixth route message comprise a NEXT_HOP attribute, the path attributes in the sixth route message comprise the second next hop list attribute, and a value of the second next hop is equal to a value of the NEXT_HOP attribute in the sixth route message, wherein the tail node of the second path generates the second route message;

determining, by the first BGP speaker, that a quantity of next hops in the first next hop list attribute is less than a quantity of next hops in the second next hop list attribute; and generating, by the first BGP speaker, a route entry according to the path attributes, of the path towards the destination, in the first route message.

2. The method according to claim 1, wherein the generating, by the tail node of the first path, the first route message comprises:
  when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message comprises:
  when the route that is distributed by the second BGP speaker and is towards the destination reaches the tail node of the second path, adding, by the tail node of the second path, a second priority to the next hop list attribute in the route towards the destination; and the method further comprises:
  determining, by the first BGP speaker, that the quantity of next hops in the first next hop list attribute is equal to the quantity of next hops in the second next hop list attribute;
  determining, by the first BGP speaker, that the first priority is higher than the second priority; and
  generating, by the first BGP speaker, the route entry according to the path attributes, of the path towards the destination, in the first route message corresponding to the first priority.

3. The method according to claim 1, wherein the next hop list attribute in the third route message further comprises a path cost list, and the path cost list comprises a path cost spent from the second BGP speaker to the destination;

when the route that is distributed by the second BGP speaker reaches each node of the first path, the generating, by each node, a fourth route message comprises: adding, to a path cost list in the route towards the destination, a path cost spent from a local BGP speaker to a previous hop BGP speaker;

the next hop list attribute in the fifth route message further comprises a path cost list, and the path cost list comprises a path cost spent from the second BGP speaker to the destination;

when the route that is distributed by the second BGP speaker reaches each node of the second path, the generating, by each node, a sixth route message comprises: adding, to the path cost list in the route towards the destination, the path cost spent from a local BGP speaker to a previous hop BGP speaker; and the method further comprises:
  determining, by the first BGP speaker, that the quantity of next hops in the first next hop list attribute is equal to the quantity of next hops in the second next hop list attribute;
  determining, by the first BGP speaker, that a first cost is less than a second cost, wherein the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and
  generating, by the first BGP speaker, the route entry according to the path attributes, of the path towards the destination, in the first route message corresponding to the first cost.

4. The method according to claim 3, wherein the path cost is an Interior Gateway Protocol (IGP) cost.

5. The method according to claim 3, wherein the path cost spent from the second BGP speaker to the destination in the third route message is not equal to the path cost spent from the second BGP speaker to the destination in the fifth route message.

6. A first Border Gateway Protocol (BGP) speaker, comprising:

a receiving unit, configured to receive a first route message and a second route message that are distributed respectively by a second BGP speaker by using a first distribution path and a second distribution path, wherein a head node of the first distribution path is the second BGP speaker, a tail node of the first distribution path is the first BGP speaker, a head node of the second distribution path is the second BGP speaker, a tail node of the second distribution path is the first BGP speaker, path attributes, of a path towards a destination, in the first route message comprise a next hop list attribute, path attributes, of a path towards the destination, in the second route message comprises a next hop list attribute, and the first route message and the second route message are obtained through the following processing:

constructing, by the second BGP speaker, a third route message, wherein the third route message comprises a route towards the destination, the route towards the destination in the third route message comprises a next hop list attribute and a next hop attribute, of a next hop towards the destination, distributed by the second BGP speaker, the next hop list attribute in the third route message comprises a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, wherein the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which specifically comprises: adding a first next hop to the next hop list attribute in the route towards the destination, so as to generate a first next hop list attribute, wherein the fourth route message comprises path attributes of a path towards the destination, the path attributes in the fourth route message comprise a NEXT_HOP attribute, the path attributes in the fourth route message comprise the first next hop list attribute, and a value of the first next hop is equal to a value of the NEXT_HOP attribute in the fourth route message, wherein the tail node of the first path generates the first route message;

constructing, by the second BGP speaker, a fifth route message, wherein the fifth route message comprises a route towards the destination, the route towards the destination in the fifth route message comprises a next hop list attribute and the NEXT_HOP attribute, of a next hop towards the destination, distributed by the second BGP speaker, the next hop list attribute in the fifth route message comprises a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path, wherein the second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which specifically comprises: adding a second next hop to the next hop list attribute in the route towards the destination, so as to generate a second next hop list attribute, wherein the sixth route message comprises path attributes of a path towards the destination, the path attributes in the sixth route message comprise a NEXT_HOP attribute, the path attributes in the sixth route message comprise the second next hop list attribute, and a value of the second next hop is equal to a value of the NEXT_HOP attribute in the sixth route message, wherein the tail node of the second path generates the second route message;

a determining unit, configured to determine that a quantity of next hops in the first next hop list attribute is less than a quantity of next hops in the second next hop list attribute; and a generating unit, configured to generate a route entry according to the path attributes, of the path towards the destination, in the first route message.

7. The first BGP speaker according to claim 6, wherein the generating, by the tail node of the first path, the first route message comprises:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message comprises:

when the route that is distributed by the second BGP speaker and is towards the destination reaches the tail node of the second path, adding, by the tail node of the second path, a second priority to the next hop list attribute in the route towards the destination;

the determining unit is further configured to:

determine that the quantity of next hops in the first next hop list attribute is equal to the quantity of next hops in the second next hop list attribute; and determine that the first priority is higher than the second priority; and the generating unit is further configured to:

generate the route entry according to the path attributes, of the path towards the destination, in the first route message corresponding to the first priority.

8. The first BGP speaker according to claim 6, wherein the next hop list attribute in the third route message further comprises a path cost list, and the path cost list comprises a path cost spent from the second BGP speaker to the destination;

when the route that is distributed by the second BGP speaker and is towards the destination reaches each node of the first path, the generating, by each node, a fourth route message specifically comprises: adding, to the path cost list in the route towards the destination, a path cost spent from a local BGP speaker to a previous hop BGP speaker;

the next hop list attribute in the fifth route message further comprises a path cost list, and the path cost list comprises a path cost spent from the second BGP speaker to the destination;

when the route that is distributed by the second BGP speaker and is towards the destination reaches each node of the second path, the generating, by each node, a sixth route message specifically comprises: adding, to the path cost list in the route towards the destination, the path cost spent from a local BGP speaker to a previous hop BGP speaker;

the determining unit is further configured to:

determine that the quantity of next hops in the first next hop list attribute is equal to the quantity of next hops in the second next hop list attribute; and determine that a first cost is less than a second cost, wherein the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and the generating unit is further configured to:

generate the route entry according to the path attributes, of the path towards the destination, in the first route message corresponding to the first cost.

9. The first BGP speaker according to claim 7, wherein the path cost is an Interior Gateway Protocol (IGP) cost.

10. The first BGP speaker according to claim 8, wherein the path cost spent from the second BGP speaker to the destination in the third route message is not equal to the path cost spent from the second BGP speaker to the destination in the fifth route message.

11. A computer-readable storage device, wherein the device stores a set of instructions that may be executed to:

receive a first route message and a second route message that are distributed respectively by a second Border Gateway Protocol (BGP) speaker by using a first distribution path and a second distribution path, wherein a head node of the first distribution path is the second BGP speaker, a tail node of the first distribution path is the first BGP speaker, a head node of the second distribution path is the second BGP speaker, a tail node of the second distribution path is the first BGP speaker, path attributes, of a path towards a destination, in the first route message comprise a next hop list attribute, path attributes, of a path towards the destination, in the second route message comprises a next hop list attribute, and the first route message and the second route message are obtained through the following processing:

constructing, by the second BGP speaker, a third route message, wherein the third route message comprises a route towards the destination, the route towards the destination in the third route message comprises a next hop list attribute and a next hop attribute, of a next hop towards the destination, distributed by the second BGP speaker, the next hop list attribute in the third route message comprises a next hop, and a value of the next hop in the next hop list attribute in the third route message is equal to a value of the NEXT_HOP attribute, of a next hop towards the destination, distributed by the second BGP speaker;

sending, by the second BGP speaker, the third route message to a head node of a first path, so as to distribute a route towards the destination to each node on the first path, wherein the first path is a path in the first distribution path, the head node of the first path is a peer of the second BGP speaker, and a tail node of the first path is a peer of the first BGP speaker;

when the route that is distributed by the second BGP speaker and is towards the destination reaches each node of the first path, generating, by each node according to the route towards the destination, a fourth route message to be sent to a next hop BGP speaker, which specifically comprises: adding a first next hop to the next hop list attribute in the route towards the destination, so as to generate a first next hop list attribute, wherein the fourth route message comprises path attributes of a path towards the destination, the path attributes in the fourth route message comprise a NEXT_HOP attribute, the path attributes in the fourth route message comprise the first next hop list attribute, and a value of the first next hop is equal to a value of the NEXT_HOP attribute in the fourth route message, wherein the tail node of the first path generates the first route message;

constructing, by the second BGP speaker, a fifth route message, wherein the fifth route message comprises a route towards the destination, the route towards the destination in the fifth route message comprises a next hop list attribute and the NEXT_HOP attribute, of a next hop towards the destination, distributed by the second BGP speaker, the next hop list attribute in the fifth route message comprises a next hop, and a value of the next hop in the next hop list attribute in the fifth route message is equal to a value of the NEXT_HOP attribute, of a next hop towards the destination, distributed by the second BGP speaker;

sending, by the second BGP speaker, the fifth route message to a head node of a second path, so as to distribute a route towards the destination to each node on the second path, wherein the second path is a path in the second distribution path, the head node of the second path is a peer of the second BGP speaker, and a tail node of the second path is a peer of the first BGP speaker; and when the route that is distributed by the second BGP speaker and is towards the destination reaches each node of the second path, generating, by each node according to the route towards the destination, a sixth route message to be sent to a next hop BGP speaker, which specifically comprises: adding a second next hop to the next hop list attribute in the route towards the destination, so as to generate a second next hop list attribute, wherein the sixth route message comprises path attributes of a path towards the destination, the path attributes in the sixth route message comprise a NEXT_HOP attribute, the path attributes in the sixth route message comprise the second next hop list attribute, and a value of the second next hop is equal to a value of the NEXT_HOP attribute in the sixth route message, wherein the tail node of the second path generates the second route message;

determine that a quantity of next hops in the first next hop list attribute is less than a quantity of next hops in the second next hop list attribute; and generate a route entry according to the path attributes, of the path towards the destination, in the first route message.

12. The computer-readable storage device according to claim 11, wherein the generating, by the tail node of the first path, the first route message comprises:

when the route that is distributed by the second BGP speaker and is towards the destination reaches the tail node of the first path, adding, by the tail node of the first path, a first priority to the next hop list attribute in the route towards the destination;

the generating, by the tail node of the second path, the second route message comprises:

when the route that is distributed by the second BGP speaker and is towards the destination reaches the tail node of the second path, adding, by the tail node of the second path, a second priority to the next hop list attribute in the route towards the destination;

wherein the device further storages instructions that may be executed to:

determine that the quantity of next hops in the first next hop list attribute is equal to the quantity of next hops in the second next hop list attribute; and determine that the first priority is higher than the second priority; and generate the route entry according to the path attributes, of the path towards the destination, in the first route message corresponding to the first priority.

13. The computer-readable storage device according to claim 11, wherein the next hop list attribute in the third route message further comprises a path cost list, and the path cost list comprises a path cost spent from the second BGP speaker to the destination;

when the route that is distributed by the second BGP speaker and is towards the destination reaches each node of the first path, the generating, by each node, a fourth route message specifically comprises: adding, to the path cost list in the route towards the destination, a path cost spent from a local BGP speaker to a previous hop BGP speaker;

the next hop list attribute in the fifth route message further comprises a path cost list, and the path cost list comprises a path cost spent from the second BGP speaker to the destination;

when the route that is distributed by the second BGP speaker and is towards the destination reaches each node of the second path, the generating, by each node, a sixth route message specifically comprises: adding, to the path cost list in the route towards the destination, the path cost spent from a local BGP speaker to a previous hop BGP speaker;

wherein the device further storages instructions that may be executed to:

determine that the quantity of next hops in the first next hop list attribute is equal to the quantity of next hops in the second next hop list attribute; and determine that a first cost is less than a second cost, wherein the first cost is equal to a sum of path costs in a path cost list carried in the first next hop list attribute plus a cost spent from the first BGP speaker to the tail node of the first path, and the second cost is equal to a sum of path costs in a path cost list carried in the second next hop list attribute plus a cost spent from the first BGP speaker to the tail node of the second path; and generate the route entry according to the path attributes, of the path towards the destination, in the first route message corresponding to the first cost.

14. The computer-readable storage device according to claim 12, wherein the path cost is an Interior Gateway Protocol (IGP) cost.

15. The computer-readable storage device according to claim 13, wherein the path cost spent from the second BGP speaker to the destination in the third route message is not equal to the path cost spent from the second BGP speaker to the destination in the fifth route message.

* * * * *